INVENTOR
ROGER H. FOURNIER
ATTORNEY

INVENTOR
ROGER H. FOURNIER

United States Patent Office 3,482,356
Patented Dec. 9, 1969

3,482,356
CRANKSHAFT ANGULAR INDEXING APPARATUS FOR MACHINE TOOLS
Roger H. Fournier, Millbury, Mass., assignor to Norton Company, Worcester, Mass., a corporation of Massachusetts
Filed Jan. 3, 1967, Ser. No. 606,866
Int. Cl. B24b 5/00, 17/00, 41/06
U.S. Cl. 51—105
8 Claims

ABSTRACT OF THE DISCLOSURE

Improved apparatus for angularly indexing a crankshaft mounted in a pair of opposed work holders or opposed pot chucks respectively rotatably supported in first and second work heads of a machine tool to position the respective crankpins thereof for successive machining operations, wherein one work holder comprises a pot chuck mounted at one end of a spindle rotatably mounted in one of the workheads, a radial shaft rotatably mounted in the pot chuck and connected by bevel gearing to a countershaft, an index locator plate mounted for rotation in unison with the countershaft, the index locator plate and the countershaft being adjustable radially toward and away from the axis of rotation of the spindle, a longitudinal shaft extending concentrically within the spindle and connected by bevel gearing to the radial shaft to rotate the radial shaft, a bevel gear splined to the longitudinal shaft and connected by gearing to a pinion, a longitudinally movable hollow shaft with rack teeth in mesh with the pinion, a collar on the hollow shaft, a downwardly extending arm on the work head supporting a fulcrum, an angular lever supported by the fulcrum with one end supporting rollers engaging the collar and the other end supporting a follower roller engaging a stepped cam track in an elongated cam plate, whereby the index locator plate is rotated through successive predetermined angles when the crankshaft is moved longitudinally with the first and second work heads to bring successive crankpins into the proper axial position for a machining operation, for example grinding.

BACKGROUND OF THE INVENTION

The field to which this invention is particularly applicable is abrading machines having a rotary tool, a rotating workpiece, and a rotary work holder.

The angular indexing apparatus of the present invention may be substituted for the apparatus for angular indexing disclosed in U.S. Patent 3,142,941 of Fournier et al., which incorporated by reference U.S. Patents 2,723,503 of Mader, 3,076,296 of Joyce and Reissue 24,885 of Narel et al. based on 2,813,380. The state of the prior art is further disclosed in U.S. Reissue Patent 21,582 of Klingele based on 2,014,768. The references indicating the state of the art are incorporated herein.

The angular indexing apparatus of Fournier et al., namely the camming element assemblies 41 illustrated in FIGURES 1 and 2 thereof and the automatic means for operating these assemblies illustrated in FIGURE 5 thereof, may be replaced by the angular indexing apparatus of the present invention. The grinding machine disclosed in Fournier et al. so modified may also be further modified by the replacement of the workpiece clamping assemblies 25 and 27 and the hydraulic control system therefore described in Fournier et al. with the simplified arrangement of corresponding elements described and illustrated in my copending applicatiton Ser. No. 603,194 filed Dec. 20, 1966 and entitled Rotatable Work Holder for Machine Tools, now U.S. Patent No. 3,404,492 issued Oct. 8, 1968.

According to the disclosure of Klingele, with particular reference to FIGURE 1 thereof, a crankshaft is turned through a predetermined angle relative to the chuck 34 in which it is supported by a reciprocating shaft 51 having a threaded portion 67 cooperating with a spiral nut 68 mounted in spindle 44 to rotate the shaft 51 and pinion 69 splined thereto. The pinion 69 rotates chuck 34 clamped to the end of the crankshaft so that successive crankpins are angularly indexed for grinding. The shaft 51 is actuated, as shown in FIGURES 1 and 6, by a complex arrangement of cams 112 mounted on a cam wheel 107 controlling piston 55 and 56 to move racks 57 and 58 whereby eccentrics 61 and 62 position box 64 and reciprocate shaft 51.

SUMMARY OF THE INVENTION

According to the present invention, a crankshaft mounted in and eccentrically of the common axis of rotation of a spaced pair of workholders such as pot chucks, one of which is mounted on the front of one work head by means of a spindle rotatable in the workhead, is rotated relative to the work holders or pot chucks and thus angularly indexed by a slidable rack and pinion adjacent the other end of the one work head, to position successive crankpins on the crankshaft substantially in their proper positions concentric of the axis of rotation for grinding or other machining operations thereon. The slidable rack is moved longitudinally relative to the one work head and within the spindle by an angular lever having at its free end a follower roller positioned to run in a stepped cam slot in an elongated cam plate mounted fixedly upon the base of a grinding machine or other machine tool parallel to the axis of rotation of the spindle in the one work head. The configuration of the stepped slot is such that a predetermined rotation relative to the pot chuck is imparted to the crankshaft whenever the crankshaft is moved longitudinally with the table supporting the first and second work heads in turn supporting the crankshaft to bring successive crankpins into the proper axial position for grinding.

The index locator plate engaging and rotatable with a crankshaft relative to the pot chuck rotatably supported by the one work head is readily adjustable radially of the pot chuck without interference with the drive train connecting the slidable rack to the index locator plate, in order to accommodate a crankshaft with a different throw between its main bearings and its crankpin bearings.

Similarly, the angular indexing apparatus of the instant invention is readily adapted to accommodate a crankshaft with different angles between successive crankpins and even a crankshaft with a different number of crankpins simply by replacing the elongated cam plate with a different cam plate having a stepped cam slot properly shaped to correspond to the configuration of the different crankshaft to be ground.

It is therefore an object of the present invention to provide an angular indexing apparatus for crankshaft grinding machines or other machine tools, or the like, which is substantially less complex than such apparatus disclosed in the prior art.

Another object of the present invention is an angular indexing apparatus which automatically indexes the respective crankpins of a crankshaft to substantially the proper angular position for a grinding or other machining operation as a direct function of the axial indexing of the crankshaft required to position the respective crankpins thereof for a grinding or other machining operation.

Yet another object of the present invention is an angular indexing apparatus operative automatically by means of a precision angular indexing mechanism to position each crankpin of a crankshaft successively in the precise proper angular position for a grinding or other machining operation prior to such operation.

Still another object of the invention is an angular indexing apparatus for crankshaft grinding machines or other machine tools, or the like, which facilitates the adjustment or adaptation of various components of a machine to accept crankshafts of different configurations including crankshafts with different throws between their main bearings and their crankpin bearings.

BRIEF DESCRIPTION OF THE DRAWINGS

The invention will now be described in greater detail with reference to the drawings in which:

FIG. 5 is a side view of the cam plate with a straight cam slot for returning the angular indexing apparatus to its starting position during the quick return movement;

FIG. 6 is a fragmentary vertical longitudinal section taken on line 6—6 of FIGURE 7;

FIG. 7 is a fragmentary vertical transverse section taken on line 7—7 of FIG. 2 but with the follower roller shown displaced lengthwise of the cam track from its position as shown in FIG. 2 sufficiently to rotate the bellcrank into the position shown in FIG. 6;

FIG. 8 is fragmentary horizontal longitudinal section taken on line 8—8 of FIG. 6.

Figure 1:
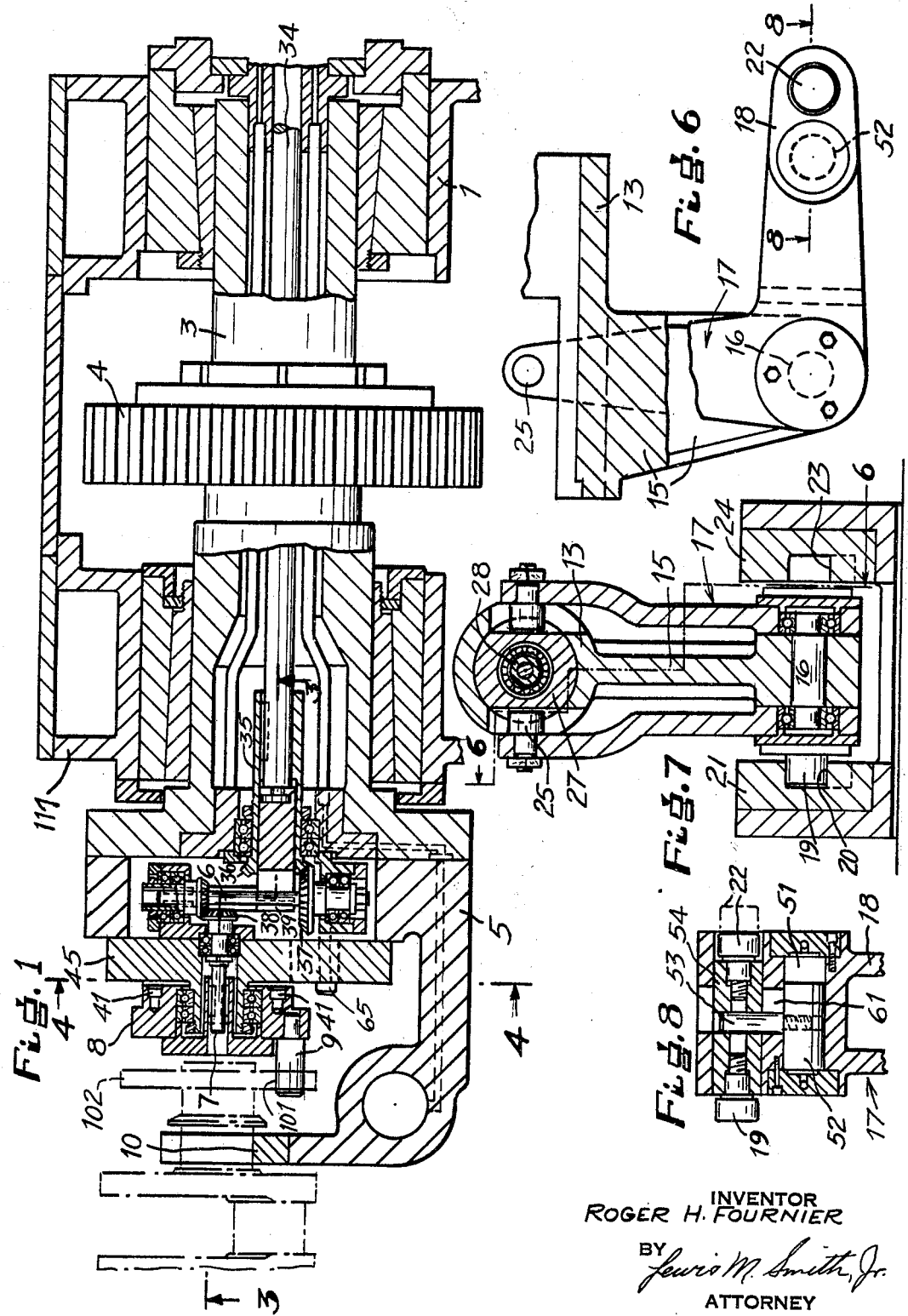
FIG. 1 is a vertical longitudinal section of the front end of one work head and the associated pot chuck of a crankshaft grinding machine.
Figure 9:
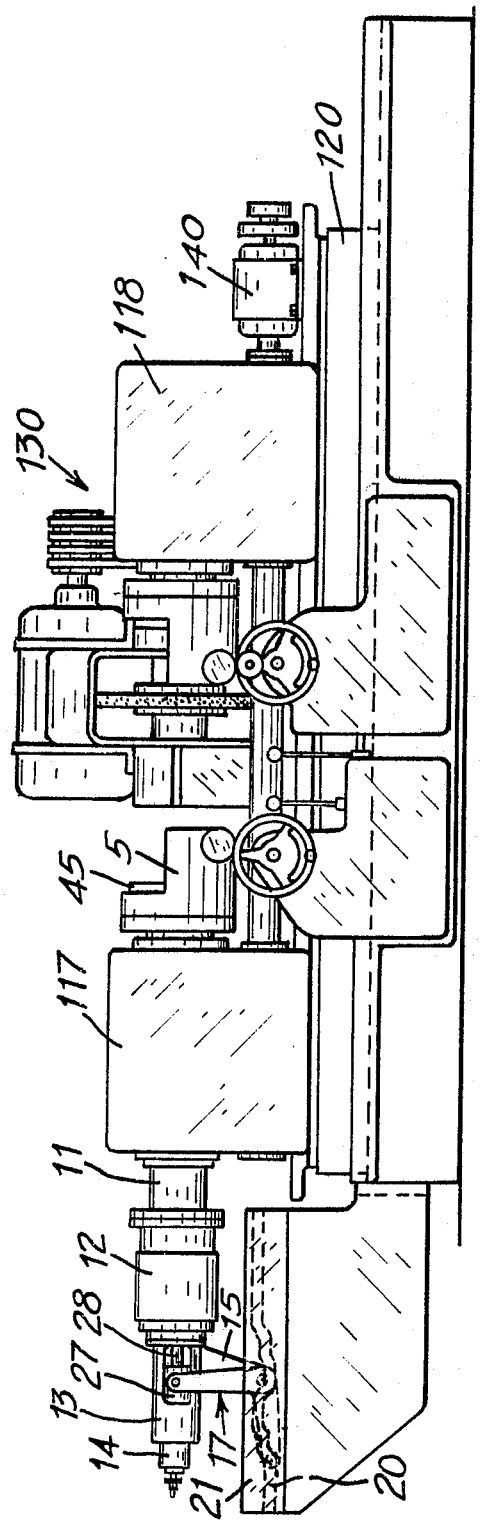
FIG. 9 is a front elevation of a crankpin grinding machine equipped with the angular indexing apparatus described and illustrated herein shown in greater detail in FIGS. 1 through 8 and particularly in FIGS. 1, 2 and 6 in partial elevations as seen from the rear of the crankpin grinding machine illustrated in FIG. 9.

The particular embodiment of the crankshaft grinding machine generally designated by reference numeral 130 and shown best in FIG. 9 of the drawings comprises a first work head 117 arranged to be mounted with a spaced opposed second work head 118 upon a table 120 slidably mounted on a stationary base 2, as previously disclosed in the patents of the prior art set forth above. The first work head 117 has a spindle 3 rotatably mounted therein arranged to be rotated in synchronism with a similar spindle rotatably mounted in the second work head 118 by a common work drive of the general type illustrated in FIGURE 3 of Patent 2,723,503 of Mader operatively connected to a spindle 3 by the sprocket 4 fixedly mounted upon spindle 3 and arranged to be driven by a cog belt. A work holder comprising pot chuck 5 fixedly secured to the face plate at the front end of spindle 3 is provided with a half bearing 10 in which a crankshaft main bearing is supported and maintained by a coacting clamping jaw as shown in FIGURE 1 corresponding to the clamping jaw illustrated in FIG. 2 of Fournier et al. or the clamping jaw illustrated in my copending application Ser. No. 603,194, now Patent No. 3,404,492. A radially disposed splined shaft 6 mounted rotatably within the pot chuck 5 is connected by bevel gears to a counter shaft 7 in splined or keyed engagement with an index locator plate 8 carrying a crankshaft locating pin 9 which cooperates, as particularly disclosed in FIGURE 7 of Fournier et al., with a locating hole 101 in the flange 102 formed integrally with the crankshaft supported in half bearing 10.

Alternatively, the respective work heads 117 and 118 may be driven synchronously by a work head drive motor 140 mounted on table 120 as shown in FIG. 9. In either case, neither the type, nor the configuraton, nor the location of the work drive motor forms any part of the invention described herein.

Figure 2:
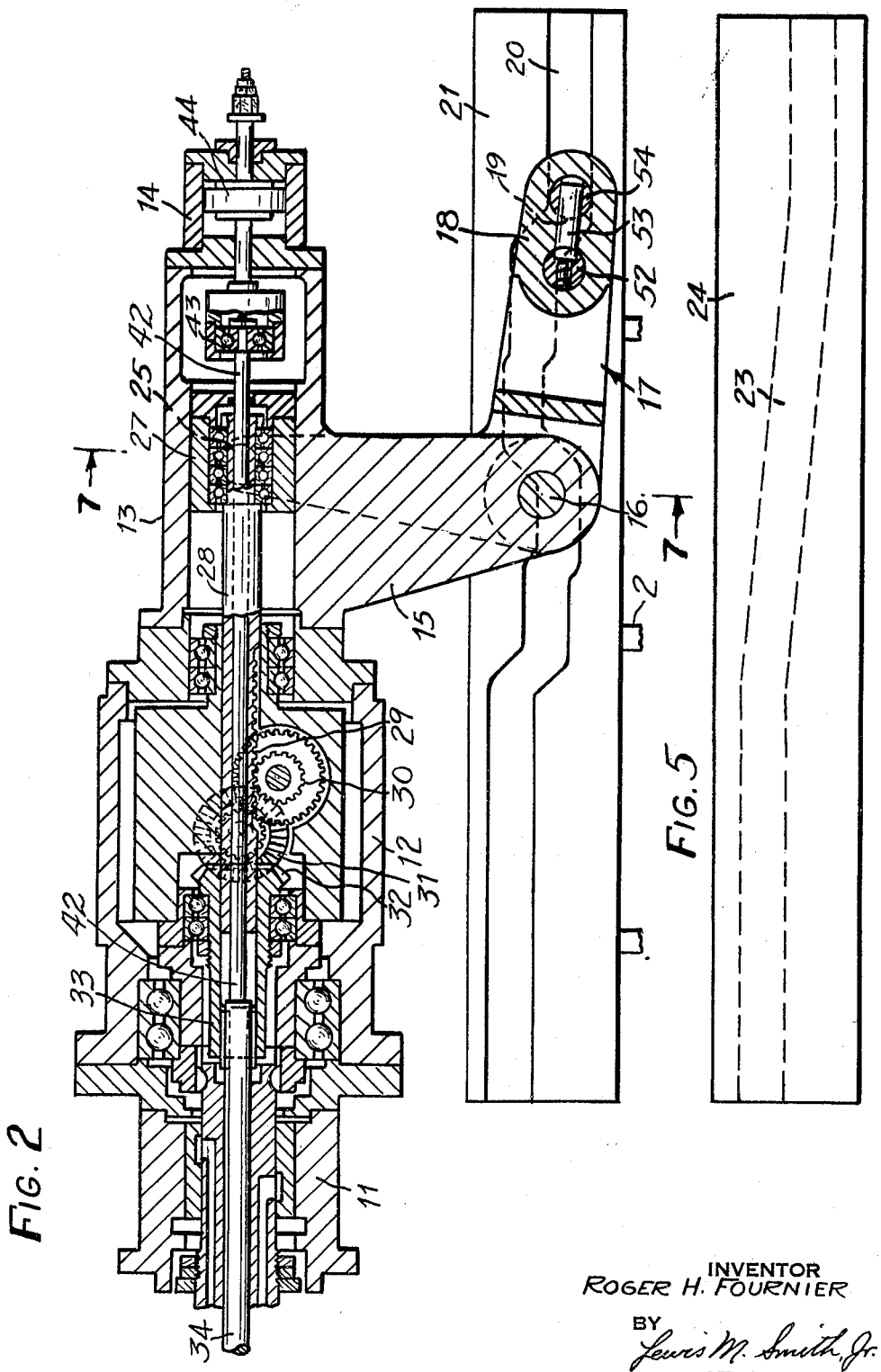
FIG. 2 is a vertical longitudinal section of the rear portion of one work head also showing a portion of the base of a crankshaft grinding machine.

The work head 117 has additional sections 11, 12, 13 and 14 interconnected to form its rear end, as shown in FIGURE 2, to enclose and support additional components of the work head 117 described further below and all movable as a unit with the supporting table 120 when it is moved slidably relative to the base 2.

Section 13 carries a downwardly extending arm 15 providing a fulcrum 16 for bifurcated angular lever 17, the free lower end 18 of which carries a retractable follower roller 19 arranged when it is extended as shown in FIGURE 8 to run in stepped cam track 20 in cam plate 21 during succeeding crankpin grinding operations, and also carries retractable follower roller 22 arranged when it is extended from its retracted position shown in FIG. 8 to run in straight cam track 23 in cam plate 24, on the opposite side of the arm during return movement of the supporting table to its starting positon. As seen best in FIGURE 8, the follower roller 19 is hydraulically actuated to engage cam track 20 during succeeding crankshaft axial indexing operations by the introduction of pressure fluid into the cylinder 51 formed within the lower end 18 of the lever to displace the piston 52 therein so that the pin 53 projecting laterally from the piston through a suitable slot 61 displaces the slide 54 on which the follower roller 19 is supported. Conversely, the follower roller 22 is hydraulically actuated to engage cam track 23 during return movement by the application of pressure fluid to the other end of the cylinder 51 to displace the piston 52, the pin 53, and the slide 54 in the opposite direction to move the follower roller 22 also supported by slide 54 into operative engagement with cam track 23.

The bifurcated upper ends of lever 17 carry inwardly facing rollers 25 engaging cooperating recesses in a collar 27 on a longitudinally movable and hollow shaft 28 provided with rack teeth 29 along its length disposed in driving engagement with a pinion 30 for transmitting rotary motion through a gear train 31 to a bevel gear 32 on an elongated hub 33 slidably splined to the enlarged front half of a longitudinal central shaft 34, the front end of which is slidably keyed or splined to the elongated hollow hub 35 of bevel gear 36 to drive bevel gear 37 on one end of the radial shaft 6. The other end of radial shaft 6 transmits rotation by a slidable splined connection to bevel gears 38 and thence to the index locator plate 8.

Figure 3:
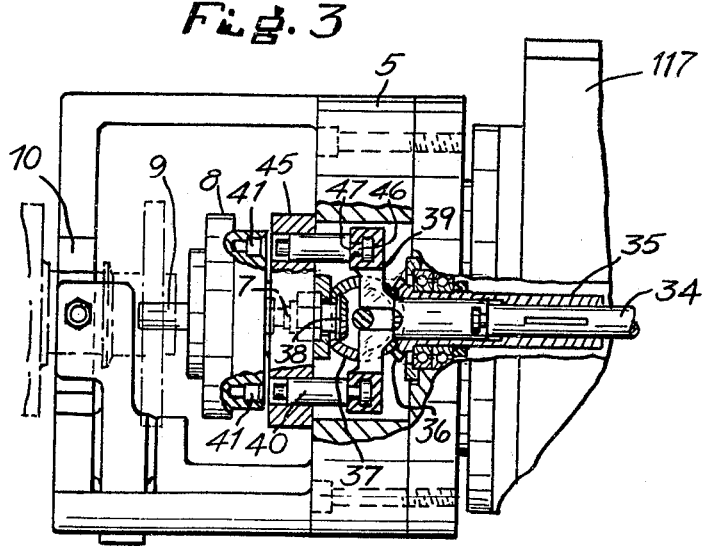
FIG. 3 is a horizontal longitudinal section of the front portion of one work head taken on line 3—3 of FIG. 1.

The elements of the apparatus arranged to achieve the precise angular adjustment of the crankshaft necessary to locate successive crankpins precisely in their proper positions for a grinding operation are particularly illustrated in FIGURE 3 and sections 13 and 14 of the work head 117 as shown in FIGURE 2. The index locator plate 8 with multiple pairs of indexing holes 41 positioned diametrically thereof at predetermined angles corresponding precisely to the angular positions of the respective crankpins of the crankshaft engaged thereby is secured in each of its precise angular positions by the forward movement of a pair of indexing pins 40. The indexing pins 40 have heads supported on reduced necks 46 and slidable in parallel T-slots 47 in the respective arms of yoke 39 which is in turn connected to the left end of shaft 34 as seen in FIGURE 1. The shaft 34 is connected at its right end as seen in FIGURE 2 to the reduced shaft extension 42 in turn connected through swivel joint 43 to piston 44, so that movement to the left by piston 44 advances the indexing pins 40 into a pair of the indexing holes 41 to secure the index locator plate 8 precisely in a predetermined angular position relative to the pot chuck determined by the position of the follower roller 19 in the stepped cam track 20, and so that movement to the right by piston 44 releases the index locator plate 8 for rotation relative to the pot chuck 5 as the follower roller 19 is displaced by the stepped cam track 20.

Figure 4:
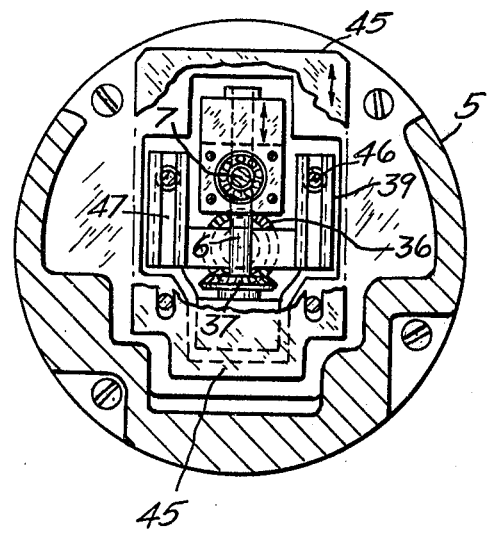
FIG. 4 is a vertical transverse section through one work head taken on line 4—4 of FIGURE 1.

Plate 45 shown in FIGURE 1 and shown broken away in FIGURE 4 supports countershaft 7, bevel gears 38, and index locator plate 8 in fixed relation to the pot chuck 5 by suitable attachment means such as bolts 65 which may be loosened to permit manual adjustment of the plate 45 radially of the pot chuck 5, so that the index locator plate 8 may be adjusted to rotate about an axis spaced radially from the axis of rotation of the pot chuck a distance equal to the throw of the crankshaft to be engaged by the index locator plate 8.

Concurrently, the supporting means on the respective pot chucks for supporting a pair of main bearings adjacent the opposite ends of a crankshaft are properly adjusted to the same dimensional relationship. For example, the half bearing 10 on pot chuck 5 is replaced by a half bearing of the proper diameter to support the main bearing engaged thereby centered about an axis spaced from the axis of rotation of the pot chuck a distance equal to the throw of the crankshaft to be supported by the pot chuck, and hence coincident with the axis about which the index locator plate 8 is positioned for rotation with the countershaft 7. At the same time the clamping arm may be adjusted by replacing the auxiliary clamping element.

Since both the configuration of index locator plate 8 and the configuration of elongated cam plate 21 are determined by the configuration of the particular crankshaft to be ground on a grinding machine incorporating the instant invention, the index locator plate 8 is arranged as shown best in FIGURE 1 and the elongated cam plate 21 is fixedly suppported on base 2 by a suitable mounting means as shown in FIGURE 7 or FIGURE 9 by attachment means not shown such as machine screws or bolts or the like, so that they may be interchanged readily with corresponding parts of a configuration suitable for grinding a different crankshaft, as required.

DESCRIPTION OF THE OPERATION OF THE PREFERRED EMBODIMENT

Before a grinding operation is commenced with the apparatus of the present invention, the index locator plate 8 and the elongated cam plates 21 both corresponding to the dimensions of the particular crankshaft to be ground are mounted on the work head 117 and on the base 2, respectively, of a suitable grinding machine 130 and the table supporting the work head 117 and work head 118 for sliding movement on the base 2 is moved to the right as seen in FIGURE 2 into the position shown therein.

The endmost main hearings of the crankshaft are positioned in the half bearings 10 of the pot chucks respectively rotatably supported by work heads 117 and 118 so called herein because they are both driven, synchronously, in the machine tool embodiment described herein, but otherwise identifiable in general usage as the headstock and footstock of a grinding machine or other machine tool. The half bearings 10 of the present invention correspond to the half bearing 35, particularly shown in FIGURE 1 of Fournier et al., and cooperate with clamping jaws such as those identified in FIGURES 2 and 3 of Fournier et al. by reference numeral 37. The locating pin 9 is inserted in a locating hole in the crankshaft bearing flange, such as shown in FIGURE 7 of Fournier et al., wherein a locating pin 63 is shown in engagement with a locating hole 101 in a crankshaft flange 102.

The apparatus is now ready for the predetermined sequence of grinding and indexing operations necessary to grind all of the crankpins on the crankshaft. With the work head 117 positioned as shown in FIGURE 2 so that the first crankpin is precisely positioned angularly by the means described above and precisely positioned axially by means described and illustrated in Fournier et al. for a grinding operation thereon, the crankshaft is fully constrained by the clamping jaws mounted upon the pot chucks and the crankshaft is rotated about the first crankpin as the grinding wheel is fed into engagement with the first crankpin to perform a grinding operation thereon, after which the grinding wheel is retracted.

Thereafter, with the pressure exerted by the clamping jaws reduced sufficiently to permit the crankshaft to be rotated relative to the pot chucks and with piston 44 moved to the right as seen in FIGURE 2 to disengage pins 40 from the locating holes 41, the table 120 supporting the coacting work heads 117 and 118 is displaced a distance sufficient to axially index the crankshaft into the precise position for grinding the second crankpin thereon, and the concurrent longitudinal displacement of the follower roller 19 relative to the elongated cam plate 21 passes the follower roller 19 over a step in cam track 20 arranged to rotate index locator plate 8 sufficiently to position the crankshaft substantially in the proper angular position for grinding the second crankpin. Next, the piston 44 is displaced to the left to seat the pins 40 in cooperating locating holes 41 to precisely angularly position the crankshaft for grinding the second crankpin, and the clamping jaws are returned to their fully clamped condition. With the crankshaft rotating about the second crankpin the grinding wheel is fed into engagement with the second crankpin to perform a grinding operation thereon, after which the grinding wheel is retracted.

Subsequent axial and concurrent angular indexing operations are alternated with subsequent grinding operations until all of the crankpins on the crankshaft have been ground. Thereafter, the follower roller 19 is retracted from engagement with stepped cam track 20 in cam plate 21, and follower roller 22 is concurrently extended into engagement with straight cam track 23 in elongated cam plate 24 so that index locator plate 8 is returned to its starting position while the table 120 supporting the coacting work heads 117 and 118 is returned rapidly to the right as seen in FIGURE 2 into its starting position. With the work head 117 positioned as shown in FIGURE 2 relative to the elongated cam plate 21 the piston 51 is actuated in the opposite direction to retract the follower roller 22 from engagement with the straight cam track 23 and the follower roller 19 is extended concurrently into operative engagement with the stepped cam track 20 before the next grinding and indexing cycle is initiated.

Finally, the clamping jaws are fully opened and the crankshaft on which all of the crankpins have been ground is replaced with a crankshaft having crankpins yet to be ground by repeating the grinding and indexing cycle described above.

It will be understood that this invention is susceptible to modification in order to adapt it to different usages and conditions and, accordingly, it is desired to comprehend such modifications within this invention as may fall within the scope of the appended claims.

I claim:

1. In a grinding machine including a base and spaced opposed headstock and footstock assemblies mounted upon the base to support a crankshaft therebetween and collectively movable upon said base lengthwise of a crankshaft supported thereby, a crankshaft angular indexing apparatus comprising:
   (a) an elongated work holder mounted in the headstock for rotation about its longitudinal axis;
   (b) means for angularly indexing a crankshaft supported thereby relative to said work holder mounted upon said work holder for rotation selectively with and relative to said work holder;
   (c) means for converting movement longitudinally relative to said work holder into movement rotationally relative to said work holder mounted for rotation in said headstock and operatively engaging said means for angularly indexing a crankshaft;
   (d) a lever pivotally mounted upon said headstock having a first end movable substanaitlly longitudinally of said work holder and supporting actuating means engaging said means for converting movement longitudinally relative to said work holder into movement rotationally relative to said work holder;

(e) an elongated cam plate mounted fixedly upon said base longitudinally of said work holder and having a stepped cam track therealong; and (f) said lever having a second end supporting follower means engaging the stepped cam track on said cam plate.

2. The machine tool of claim 7, wherein said means for angularly indexing a crankshaft comprises an index locator plate operatively engaged with the given crankshaft in fixed angular relation thereto mounted upon and rotatable with a countershaft about said second predetermined axis, a radial shaft rotatably mounted in said first work holder operatively connected to said countershaft by first bevel gearing, a longitudinal shaft rotatable about said first predetermined axis and operatively connected to said radial shaft by second bevel gearing mounted adjacent one end of said longitudinal shaft, and a bevel gear mounted adjacent the other end of said longitudinal shaft and engaging said means for converting movement longitudinally relative to said first work holder into movement rotationally relative to said first work holder.

3. The machine tool of claim 2, wherein said longitudinal shaft is also movable longitudinally relative to said first work holder, said second bevel gearing, and said bevel gear, and, in addition, indexing pin means retractably mounted in said first work holder for movement selectively into and out of engagement with locating holes in said index locator plate, positioning means for said indexing pin means operatively interconnecting said indexing pin means and on one end of said longitudinal shaft, and actuating means for said indexing pin means connected to the other end of said longitudinal shaft.

4. The machine tool of claim 3, wherein said index locator plate, said countershaft, said first bevel gearing, and said indexing pin means are mounted upon supporting means adjustable radially of said first work holder, said first bevel gearing is mounted slidably upon said radial shaft, and said indexing pin means is slidable radially of said first work holder in said positioning means for said indexing pin means.

5. The machine tool of claim 2, wherein said means for converting movement longitudinally relative to said first work holder into movement rotationally relative to said first work holder comprises a hollow shaft mounted concentrically of said longitudinal shaft within said first work head and having rack teeth lengthwise thereof, a pinion gear operatively engaging said rack teeth mounted for rotation in said first work head, gear means operatively interconnecting said pinion gear and said bevel gear, and a collar engaged by said actuating means supported by the first end of said lever and mounted rotatably upon said hollow shaft and operative to displace said hollow shaft longitudinally of said first work head to rotate said pinion gear in response to movement of said lever.

6. The machine tool of claim 7 wherein said crankshaft angular indexing apparatus further comprises a second elongated cam plate mounted fixedly upon said base longitudinally of said work holder and having a straight cam track extending therealong, wherein said follower means supported on the second end of said lever comprises a first follower roller selectively movable into and out of engagement with the stepped cam track and a second follower roller selectively movable out of and into engagement with the straight cam track, and follower actuating means operative in one direction to engage said first follower roller and disengage said second follower roller and operative in the other direction to engage said second follower roller and disengage said first follower roller.

7. A machine tool including a base; a table reciprocably slidably mounted upon said base; spaced first and second work heads fixedly mounted upon said table to support a given crankshaft therebetween and collectively movable with said table upon said base lengthwise of the given crankshaft supported by said work heads; and a crankshaft angular indexing apparatus comprising;

first and second work holders mounted in said first and second work heads, respectively, for rotation about a common first predetermined axis, means for angularly indexing the given crankshaft support by said work holders relative to said work holders, mounted upon said first work holder for rotation selectively with and relative to said first work holder about a second predetermined axis parallel to said first predetermined axis, means for converting movement longitudinally relative to said first work holder into movement rotationally relative to said first work holder mounted for rotation in said first work head and operatively engaging said means for angularly indexing the given crankshaft, an elongated cam plate mounted fixedly upon said base lengthwise of the given crankshaft and having a stepped cam track therealong, and a lever pivotally mounted upon said first work head having a first end, movable substantially longitudinally of said first work head, supporting actuating means engaging said means for converting movement longitudinally relative to said first work holder into movement rotationally relative to said first work holder, and having a second end supporting follower means operatively engaging the stepped cam track on said cam plate.

8. The machine tool of claim 2, wherein said longitudinal shaft is also movable longitudinally relative to said first work holder, said second bevel gearing, and said bevel gear, and, in addition, precision angular indexing means retractably mounted in said first work holder for movement selectively into and out of operative engagement with said index locator plate, positioning means for said precision angular indexing means operatively interconnecting said precision angular indexing means and one end of said longitudinal shaft, and actuating means for said precision angular indexing means, connected to the other end of said longitudinal shaft, operative to actuate said positioning means to move said precision angular indexing means into operative engagement with said index locator plate when said means for converting movement longitudinally relative to said first work holder into movement rotationally relative to said first work holder is inoperative and to actuate said positioning means to move said precision angular indexing means out of engagement with said index locator plate while said means for converting movement longitudinally relative to said first work holder into movement rotationally relative to said first work holder is inoperative.

References Cited

UNITED STATES PATENTS

| Re. 21,582 | 9/1940 | Klingele | 51—105 |
| Re. 24,885 | 10/1960 | Narel et al. | 51—105 |
| 1,478,433 | 12/1923 | Harris. | |
| 1,578,232 | 3/1926 | Ferris. | |
| 1,870,764 | 8/1932 | Aeppli. | |
| 2,404,613 | 7/1946 | Belden et al. | 51—237 |
| 2,723,503 | 11/1955 | Mader | 51—105 |
| 3,142,941 | 8/1964 | Fournier et al. | 51—105 |

LESTER M. SWINGLE, Primary Examiner

U.S. Cl. X.R.

51—216, 237